March 25, 1924.
N. JENSEN
PLOWPOINT
Filed Sept. 29, 1922
1,488,346
2 Sheets-Sheet 2
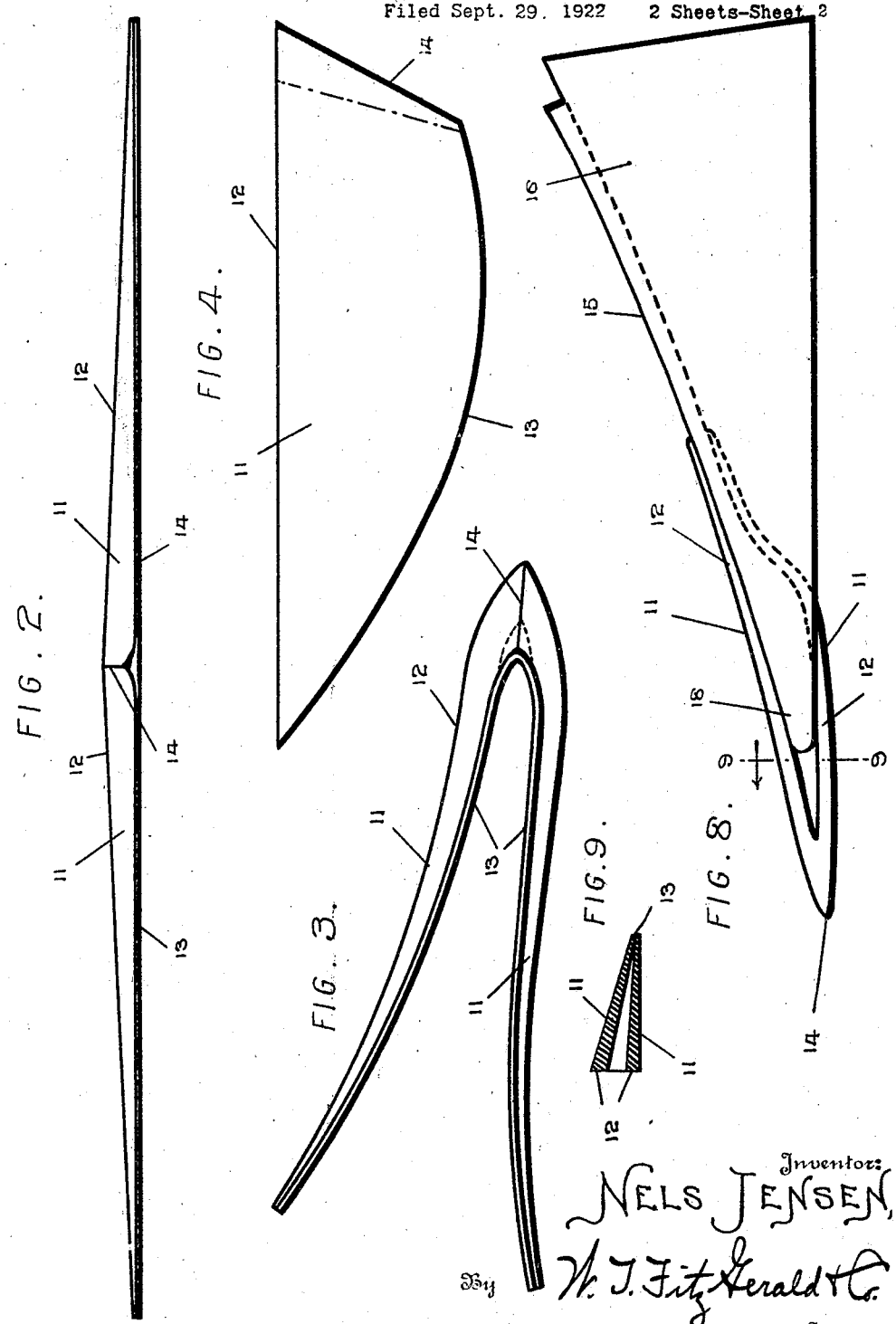
Inventor:
NELS JENSEN
By W. J. FitzGerald
Attorney.

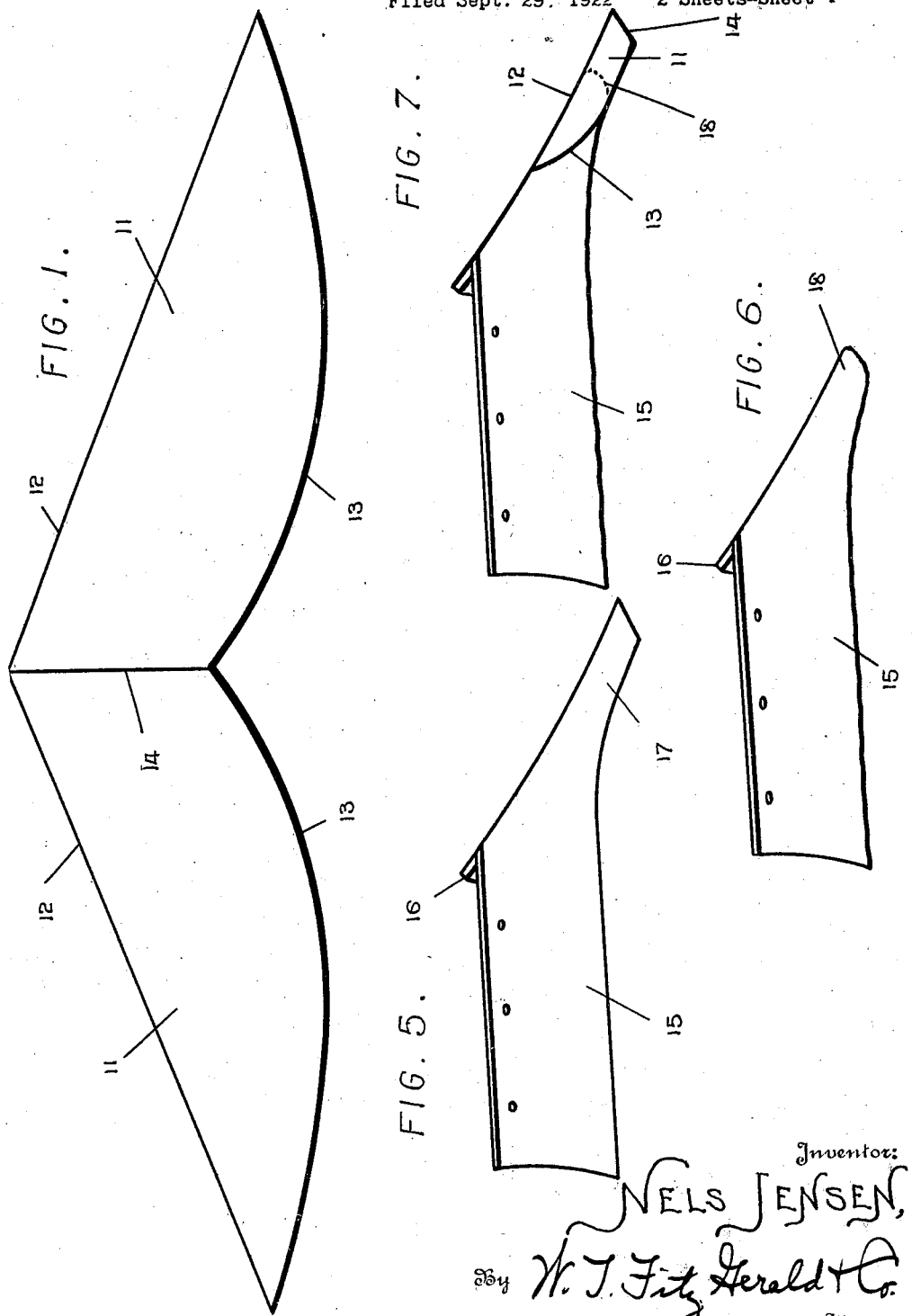

Patented Mar. 25, 1924.

1,488,346

UNITED STATES PATENT OFFICE.

NELS JENSEN, OF BERLIN, WISCONSIN.

PLOWPOINT.

Application filed September 29, 1922. Serial No. 591,278.

*To all whom it may concern:*

Be it known that I, NELS JENSEN, a citizen of the United States, residing at Berlin, in the county of Green Lake and State of Wisconsin, have invented certain new and useful Improvements in Plowpoints; and I do hereby declare the following to be a full, clear, and exact description of the invention, such as will enable others skilled in the art to which it appertains to make and use the same.

The present invention relates generally to plows, and more specifically to plow points, it being the object of the invention to provide a novel and improved repair plow point which can be conveniently applied to the share of a plow when the point thereof is worn down to such an extent as to impair the utility thereof.

Another object is the provision of such a plow point composed of a plate of metal of such form and so constructed as to be readily applied to the share over the worn-out point or stub, in order to renew the life and utility of the share in an efficient manner.

The invention is illustrated in the accompanying drawings, wherein—

Figure 1 is a plan view of the device in blank form or laid out flat, as before bending.

Fig. 2 is an edge view thereof.

Fig. 3 is an edge view of the plow point bent into shape ready for attachment.

Fig. 4 is a plan view of the device ready for attachment.

Fig. 5 is a perspective view of a new plow share showing the point in its initial form.

Fig. 6 is a similar view showing the point worn down to a stub.

Fig. 7 is a similar view showing the repair point applied.

Fig. 8 is an enlarged landside elevation showing the repair point applied to the share.

Fig. 9 is a cross section on the line 9—9 of Fig. 8.

The present plow point is formed from a metal plate or blank, as seen in Figs. 1 and 2, which has the wings or portions 11 arranged at an obtuse angle with one another, and whose landside edges 12 are straight, while the opposite edges 13 are convexly curved between the adjacent and opposite ends of said wings. There is a ridge 14 at the meeting or adjacent ends of said wings, defining the juncture thereof. The edges 13 are thin, while the edges 12 are thick at their adjacent ends, and decrease in thickness from said adjacent ends of the wings to the opposite ends thereof. The wings also decrease in thickness from the edges 12 to the edges 13, and the thickest portion of the plate is at the meeting ends of the edges 12, or at the point proper.

In preparing the device for convenient application to a plow share, the plate is doubled on the line between the wings or portions 11, to assume the shape as shown in Fig. 3, and the device is preferably supplied to the trade and users in such shape.

In order to explain the utility of the device, reference is had to Figs. 5 and 6, in which Fig. 5 shows an ordinary plow share 15 having the landside portion or flange 16 and the broad point or nose 17. Fig. 6 shows the point or nose worn down to a stub 18 rendering the share less useful. The present device is applied to the share over the worn-out point or stub 18, as shown in Figs. 7 and 8. The wings or portions 11 overlap the upper and lower surfaces of the share 15 and stub 18, with the edges 12 substantially flush with the landside portion 16, and the wings 11 are then hammered into place against the share and are welded, brazed or otherwise secured rigidly to the share. The wings can also be hammered down to be shaped to correspond with the share, and the device when thus attached will practically be of the same form as the original point 17, the ridge or nose 14 between the wings or portions 11 being extended forwardly beyond the stub 18 and serving to effectively cut into the soil. The wings or portions 11 are thick at the point proper adjacent to the landside, where the greatest wear occurs, and such wings are reduced in thickness to the edges 13 and rear ends of the wings, so as not to leave any objectionable breaks or offsets between the surfaces of the attached point and the share. Due to the fact that the wings 11 are thicker at the edges 12 than at the edges 13, when the plate is bent along the line 14, the greatest thickness of metal will be at the adjacent or forward ends of the edges 12 where they met the ridge or nose 14 between the wings. This gives sufficient thickness of metal whereby the point can be hammered down to a sharp acute angle. The device being of malleable metal, can be readily worked into shape to properly fit the share, as seen in Fig. 8, so that the device can be applied to different types of shares, as well as to conform to the different formations of the worn-down points or stubs. By applying the repair point, the life of the share is renewed and extended, without entirely discarding the share or involving greater expense in applying a new point than justified.

The edges 12 of the wings or portions 11 are arranged at acute angles with the ridge or bend 14, whereby the sharp edge of the point with be disposed obliquely with the edges 12 substantially flush with the landside of the plow, and the edges 13, where they overlap the plow share, will extend obliquely from the cutting edge to the landside. The repair point will also be thick at the point proper, so as to withstand considerable wear.

Having thus described the invention, what is claimed as new is:—

1. A repair plow point comprising a doubled plate having wings to overlap and be secured to the upper and lower surfaces of a plow share over the worn-down point thereof, said wings having edges to be disposed substantially flush with the landside of the share, said edges of the wings being thicker than the opposite edges, and the firstnamed edges decreasing in thickness from their adjacent ends to the opposite ends thereof.

2. A repair plow point comprising a doubled plate having wings to overlap and be secured to the upper and lower surfaces of a plow share over the worn-down point thereof, said wings having edges to be disposed substantially flush with the landside of the share, the wings being substantially thick at the adjacent ends of said edges thereof and decreasing in thickness to the opposite edges.

3. A repair plow point comprising a doubled plate having wings to overlap and be secured to the upper and lower surfaces of a plow share over the worn-down point thereof, and having a ridge between said wings to provide the point proper, said wings having edges to be disposed substantially flush with the landside of said share, said wings being relatively thick at the adjacent ends of said edges of the wings, and the wings deceasing in thickness to the opposite ends of said edges and to the opposite edges.

In testimony whereof I have signed my name to this specification in the presence of two subscribing witnesses.

NELS JENSEN.

Witnesses:
J. H. PICKERT,
CHARLES MANNING.